(12) United States Patent
Nishiguchi

(10) Patent No.: US 9,445,000 B2
(45) Date of Patent: Sep. 13, 2016

(54) COMMUNICATION APPARATUS, CONTROL METHOD THEREFOR, AND PROGRAM

(71) Applicant: CANON KABUSHIKI KAISHA, Tokyo (JP)

(72) Inventor: Tatsuya Nishiguchi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/551,676

(22) Filed: Nov. 24, 2014

(65) Prior Publication Data

US 2015/0146021 A1    May 28, 2015

(30) Foreign Application Priority Data

Nov. 26, 2013    (JP) ................................. 2013-244243

(51) Int. Cl.
*H04N 5/232*    (2006.01)

(52) U.S. Cl.
CPC ...... *H04N 5/23225* (2013.01); *H04N 5/23203* (2013.01)

(58) Field of Classification Search
CPC .................... H04N 5/23203; H04N 5/23206; H04N 5/23225; H04N 5/23245
See application file for complete search history.

(56) References Cited

U.S. PATENT DOCUMENTS

| 2004/0189800 A1* | 9/2004 | Berkey | H04N 5/23203 348/143 |
| 2009/0207270 A1* | 8/2009 | Gocho | H04N 1/44 348/222.1 |
| 2011/0050926 A1* | 3/2011 | Asano | G06F 21/36 348/211.2 |

FOREIGN PATENT DOCUMENTS

JP          2005136833 A      5/2005

\* cited by examiner

*Primary Examiner* — Paul Berardesca
(74) *Attorney, Agent, or Firm* — Canon U.S.A., Inc. IP Division

(57) ABSTRACT

A control method for a communication apparatus includes communicating with an external device using a communication application including a first program for receiving a user operation to communicate with the communication apparatus, and a second program for communicating with the communication apparatus, notifying the external device of an operation available for the external device among operations for controlling the communication apparatus in the communication between the communication apparatus and the external device, and determining the type of the second program used by the external device. In the notifying, a different operation to be notified is provided according to the type of the second program.

19 Claims, 11 Drawing Sheets

| PC APPLICATION MODE | PORTABLE TERMINAL APPLICATION MODE |
|---|---|
| IMAGE ACQUISITION<br>RELEASE<br>CAMERA PARAMETER SETTING<br>PC Live View<br>START/END VIDEO RECORDING | IMAGE ACQUISITION<br>RESIZED IMAGE ACQUISITION |

FIG. 9

| VENDOR APPLICATION MODE | NORMAL APPLICATION MODE |
|---|---|
| IMAGE ACQUISITION<br>RELEASE<br>CAMERA PARAMETER SETTING<br>PC Live View<br>START/END VIDEO RECORDING | IMAGE ACQUISITION |

*FIG. 12*

| PC APPLICATION MODE | PORTABLE TERMINAL APPLICATION MODE |
|---|---|
| IMAGE ACQUISITION | IMAGE ACQUISITION<br>RESIZED IMAGE ACQUISITION<br>RELEASE<br>CAMERA PARAMETER SETTING<br>PC Live View |

COMMUNICATION APPARATUS, CONTROL METHOD THEREFOR, AND PROGRAM

BACKGROUND OF THE INVENTION

1. Field of the Invention

The present invention relates to a technique for controlling an external device using communication.

2. Description of the Related Art

A system of connecting a communication apparatus, such as a digital camera, with a personal computer (PC) and controlling the digital camera from the PC to attain image acquisition control or camera control has been proposed (in, for example, Japanese Patent Application Laid-Open No. 2005-136833). With the spread of portable terminals, such as smartphones, in recent years, there is an increasing need for controlling the digital camera from various types of devices. As more devices and applications capable of communicating with digital cameras are provided, it is necessary to realize appropriate control to match a characteristic of each application or device.

SUMMARY OF THE INVENTION

The present invention relates to a communication apparatus including a communication unit configured to communicate with an external device, the external device using a communication application including a first program for receiving a user operation to communicate with the communication apparatus, and a second program for communicating with the communication apparatus, a notification unit configured to notify the external device of an operation available for the external device among operations for controlling the communication apparatus in communication between the communication apparatus and the external device, and a determination unit configured to determine a type of the second program used by the external device, wherein the notification unit provides a different operation to be notified according to the type of the second program.

Further features of the present invention will become apparent from the following description of exemplary embodiments (with reference to the attached drawings).

BRIEF DESCRIPTION OF THE DRAWINGS

FIG. 9 illustrates a table included in a digital camera.

FIG. 12 illustrates a table included in a digital camera.

DESCRIPTION OF THE EMBODIMENTS

First Embodiment

Embodiments of the present invention will be described in detail below by referring to the accompanying drawings.

Figure 1:
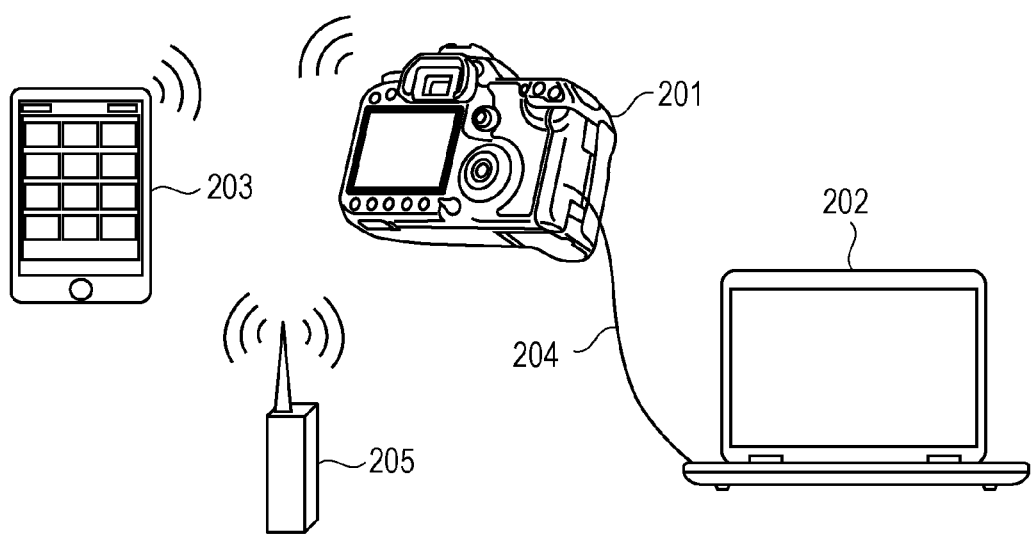
FIG. 1 is a conceptual diagram illustrating a system structure.

FIG. 1 illustrates an example of system structure capable of implementing image transfer processing according to the present embodiment.

Camera control processing illustrated in FIG. 1 is configured by a digital single lens reflex camera (hereinafter referred to as a digital camera) 201, and a PC 202 connected to and controlling the digital camera 201 as an external device, or a portable terminal 203 such as a smartphone or a tablet.

The digital camera 201 and the PC 202 can be connected by a wired cable 204 to allow transmission and reception of content data such as image data and various signals. The wired cable 204 may be a universal serial bus (USB) cable or a wired local area network (LAN) cable.

The digital camera 201 and the PC 202 of the present embodiment may also be connected in a wireless manner via an access point 205. It is assumed in the present embodiment that the digital camera 201 and the portable terminal 203 are connected by a wireless LAN.

Communications between the digital camera 201 and the portable terminal 203 may be performed by direct connection using, for example, an adhoc network, or by infrastructure connection via the access point 205 or the like. Alternatively, the camera may function as a simple access point and establish direct communications with the portable terminal 203 by the infrastructure connection.

Figure 2:
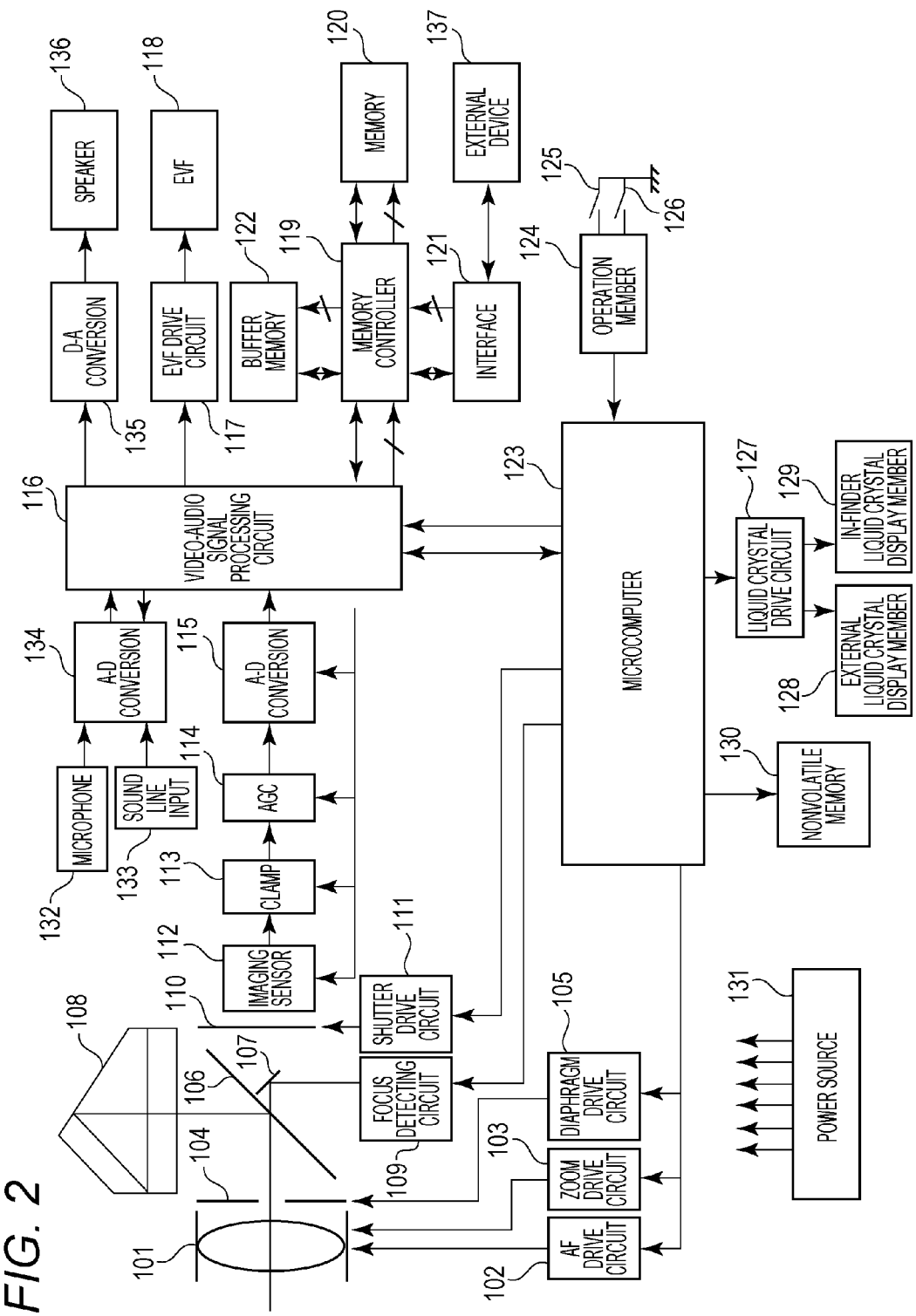
FIG. 2 is a block diagram illustrating a hardware structure of a digital camera.

FIG. 2 is a block diagram illustrating a structure of the single-lens reflex digital camera 201 according to the first embodiment of the present invention.

In FIG. 2, a photographing lens 101 and an autofocus (AF) drive unit 102 are provided. The AF drive unit 102 is formed by, for example, a direct current (DC) motor or a stepping motor, and controlled by a microcomputer 123 to perform focusing by changing the position of a focus lens of the photographing lens 101.

A zoom drive unit 103 is formed by, for example, a DC motor or a stepping motor, and controlled by the microcomputer 123 to change the position of a magnification lens of the photographing lens 101 for changing a focal length thereof.

A diaphragm 104 is provided.

A diaphragm drive unit 105 is configured to drive the diaphragm 104. The microcomputer 123 calculates a quantity to be driven and changes an optical diaphragm value.

A main mirror 106 is configured to switch light flux incident on the main mirror 106 from the photographing lens 101 between a finder side and an imaging device side. The main mirror 106 is normally arranged to reflect the light flux toward a finder unit. During photographing, however, the main mirror 106 leaps up and evacuates from the light flux to guide it to the imaging device 112. The main mirror 106 also includes a half mirror in the center portion, where a portion of light is allowed to transmit to be incident on a focus detecting sensor for detecting the focus.

A sub-mirror 107 is provided to reflect the light flux transmitted through the main mirror 106 and guide the light flux to the focus detecting sensor (arranged in a focus detecting circuit 109).

A pentaprism 108 is provided to form a finder. The finder may alternatively be formed by a focusing screen, an eyepiece lens (not illustrated), etc.

A focus detecting circuit 109 is provided. The light flux transmitted through the center portion of the main mirror 106 and reflected by the sub-mirror 107 reaches a sensor arranged in the focus detecting circuit 109 for performing photoelectric conversion. An output of the sensor is calculated to determine a defocusing amount for use in a focusing calculation. The microcomputer 123 evaluates the calculation result and instructs the AF drive unit 102 to drive a focus lens.

A focal plane shutter 110 and a shutter drive circuit 111 to drive the focal plane shutter 110 are provided. A shutter opening time is controlled by the microcomputer 123.

An imaging device 112 is formed by a charge coupled device (CCD), a complementary metal oxide semiconductor (CMOS) sensor, etc. and converts an image of an object, which has been formed by the photographing lens 101, into electric signals.

A clamping circuit 113 and an automatic gain control (AGC) circuit 114 perform basic analog signal processing, before analog to digital (A-D) signal conversion is performed, to change a clamping level or an AGC reference level by the microcomputer 123. An A-D converter 115 is configured to convert an analog output signal from the imaging device 112 into a digital signal. A video-audio signal processing circuit 116 is realized by a logic device such as a gate array.

An electric viewfinder (EVF) drive circuit 117 and an EVF monitor 118 are provided.

A memory controller 119, a memory 120, an external interface 121 capable of connecting to a computer, etc., and a buffer memory 122 are provided.

The video-audio signal processing circuit 116 performs compression processing, such as Joint Photographic Experts Group (JPEG) compression, on digitized image data, as well as filtering processing, color conversion processing, and gamma processing, and outputs a processing result to the memory controller 119.

The video-audio signal processing circuit 116 performs compression processing of audio signal supplied from a microphone 132 or a sound line input 133, and outputs a processing result to the memory controller 119. The video-audio signal processing circuit 116 may also output a video signal from the imaging device 112 or image data returned from the memory controller 119 to the EVF monitor 118 through the EVF drive circuit 117. Switching these functions is performed according to an instruction from the microcomputer 123. The video-audio signal processing circuit 116 can output, as needed, information regarding exposure, white balance, etc. of the signal from the imaging device 112 to the microcomputer 123. According to such information, the microcomputer 123 provides an instruction for adjusting a white balance, gain, etc. In the case of continuous photographing operation, photographed data acquired is first stored in a buffer memory 122 as unprocessed images. The unprocessed image data is then read through the memory controller 119, and subjected to image processing, compression processing, etc. in the video-audio signal processing circuit 116, to thereby perform continuous photographing. The number of images to be photographed continuously depends on the capacity of the buffer memory.

The video-audio signal processing circuit 116 may also output sound data from the microphone 132 or the sound line input 133 to a speaker 136 through a digital to analog (D-A) converter 135.

The memory controller 119 receives the unprocessed digital images and sound data from the video-audio signal processing circuit 116, and stores them in the buffer memory, while the processed digital images and sound data are stored in the memory 120. The image and sound data may also be output from the buffer memory 122 or the memory 120 to the video-audio signal processing circuit 116. The memory 120 may be detachable. The memory controller 119 can output the images and sound stored in the memory 120 via an external interface 121 connectable to a PC or the like.

An operation member 124 informs the microcomputer 123 of a condition thereof, and the microcomputer 123 controls various parts according to a change of the operation member.

A switch 125 is a switch 1 (referred to as SW1 hereinafter) and a switch 126 is a switch 2 (referred to as SW2 hereinafter). The switches SW1 and SW2 are turned on and off by operating a release button. Each switch is provided as an input switch of the operation member 124. When the switch SW1 alone is turned on, the release button is in a half-pressed condition where an autofocusing operation or a photometric operation are performed. When both the switches SW1 and SW2 are turned on, the release button is in a full-pressed condition and the release button is turned on to record an image. Photographing is performed in this condition. While the switches SW1 and SW2 are turned on, the continuous photographing operation is performed. The operation member 124 is also coupled with switches, which are not illustrated, such as an ISO setting button, an image size setting button, an image quality setting button, an information display button, and the conditions of the switches are detected.

A liquid crystal drive circuit 127, an external liquid crystal display member 128, and an in-finder liquid crystal display member 129 are provided. The liquid crystal drive circuit 127 follows a display content command by the microcomputer 123 to drive the external liquid crystal display member 128 and the in-finder liquid crystal display member 129. The in-finder liquid crystal display member 129 includes a backlight such as a light-emitting diode (LED) which is not illustrated, and the LED is also driven by the liquid crystal drive circuit 127. The microcomputer 123 can calculate the number of remaining images to be photographed by confirming the capacity of the memory through the memory controller 119 according to the data of expected value of the image size corresponding to the ISO sensitivity and the size and quality of the image, which have been set previously before photographing. The calculated number of remaining images can also be displayed, as needed, in the external liquid crystal display member 128 and the in-finder liquid crystal display member 129.

A nonvolatile memory (electrically erasable programmable read only memory: EEPROM) 130 can store data even when the camera is not turned on.

A power source 131 supplies necessary power to integrated circuits (ICs) and driving systems.

A microphone 132 is provided.

A sound line input 133 is provided.

An A-D converter 134 is configured to convert an analog output signal from the microphone 132 or the sound line input 133 into a digital signal.

A D-A converter 135 is configured to convert a digital signal to an analog signal.

A speaker 136 is provided.

An external device 137 is represented by a personal computer, a portable phone, a portable information terminal, etc., and transmits and receives various pieces of information and image data of the camera via the external interface 121 mentioned above. A camera provided with a communication circuit therein may also be used as an external device. In such a case, various pieces of information and image data can be transmitted and received between cameras.

Figure 3A:
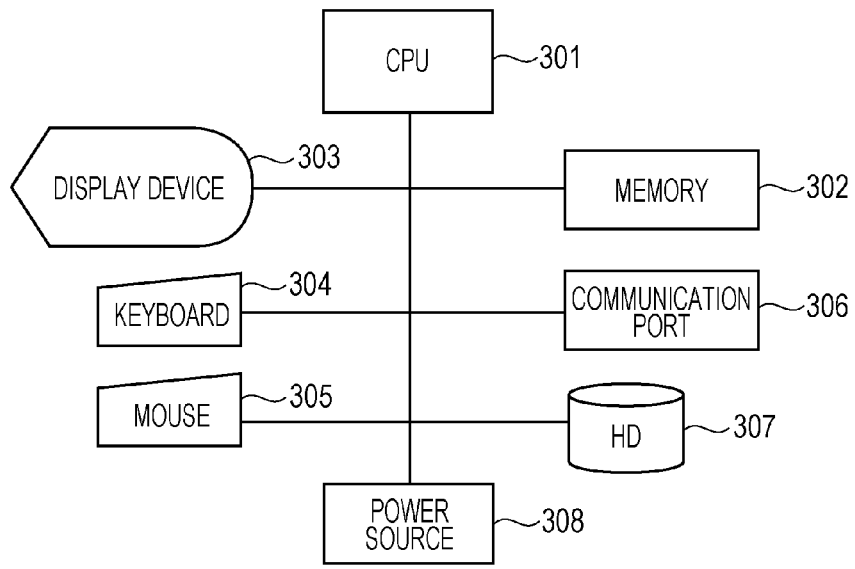
FIGS. 3A and 3B are block diagrams illustrating a hardware structure of a PC and a portable terminal.

FIG. 3A is a block diagram illustrating a hardware structure of a PC 202 according to the first embodiment of the present invention.

A central processing unit (CPU) 301, an internal memory 302, and a display device 303 including a graphic controller are provided. The display device 303 may be connected to an external monitoring device or may include a built-in monitor. A keyboard 304, a mouse 305, and a communication port 306 are provided. Communications with a camera are enabled via the communication port 306. A disk memory 307 is a hard disc (HD), for example, but is not necessarily provided in a disk-like shape, and may be a storage device such as a flash memory capable of being handled like a disk. A power source 308 is a power source in the PC.

The display device 303 displays various types of display screens including an operation screen of photographing parameters and an image display screen of live view images. An application program of such a remote photographing system is stored in the HD 307. The application program is started by triggers such as detection of a user operation, a camera device, etc. and executed by the CPU 301.

Figure 3B:
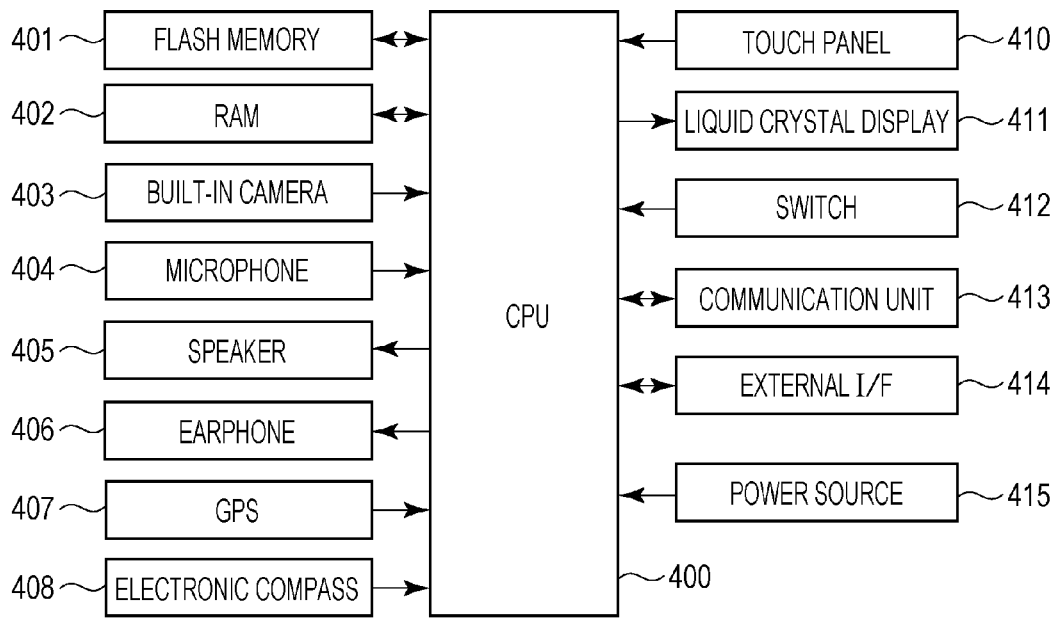

FIG. 3B is a block diagram illustrating a hardware structure of a portable terminal 203 according to the first embodiment of the present invention. Examples of the portable terminal include a portable phone such as a so-called smartphone, a tablet device, a personal digital assistant (PDA), a portable audio-visual (AV) player, an electronic book, and an electronic dictionary.

The portable terminal 203 includes a CPU 400, a flash memory 401, a RAM 402, a built-in camera 403, a microphone 404, a speaker 405, an earphone 406, a touch panel 410, a liquid crystal display 411, a switch 412, a communication unit 413, and an external interface (I/F) 414. The portable terminal 203 may also include, for example, a global positioning system (GPS) sensor 407 and an electronic compass 408. The portable terminal 203 may also include an antenna for conversation, a communication module for conversation, etc.

The CPU 400 totally controls processing executed in the portable terminal 203.

The RAM 402 is used as a working area of the CPU 400, and temporarily stores various pieces of data, such as content processed by the CPU 400, and various application programs.

The flash memory 401 stores digital photographic images taken by the built-in camera 403, various types of content such as videos, and various control programs and application programs executed by the CPU 400.

The liquid crystal display 411 is formed by an LCD such as a thin film transistor (TFT), or an organic electroluminescence display (GELD), and displays so-called graphical user interface (GUI). The liquid crystal display 411 is provided integrally with the touch panel 410. The touch panel 410 detects touch operations of a user while pictures and GUI are displayed during the execution of applications, and informs a detected result to the CPU 400. The touch panel 410 may be operated by a resistor film method or an electrostatic capacity method, but another method may also be used. The touch panel 410 allows a user to select a picture and display it in a full screen mode during the execution of the picture display application, or expand or reduce the image by a pinch-in or pinch-out operation.

The switch 412 receives, for example, user operations of a power switch, an activation button, which cannot be received from the touch panel 410, and transmits an input signal to the CPU 400.

The earphone 406 and the speaker 405 output sound signals stored in the above-mentioned flash memory 401, etc. or received from the communication unit 413, the external I/F 414, etc.

The communication unit 413 performs communication processing with other devices via a network, such as the Internet or a LAN. The communication unit 413 may include a wireless LAN module or a wireless wide area network (WWAN) module.

The external I/F 414 exchanges data in compliance with various standards, such as the USB or a high-definition multimedia interface (HDMI) (registered trademark).

The power source 415 is provided for the portable terminal 203. Typically, a chargeable type power source, such as a lithium-ion battery, is used.

<SDK>

Figures 4, 5:
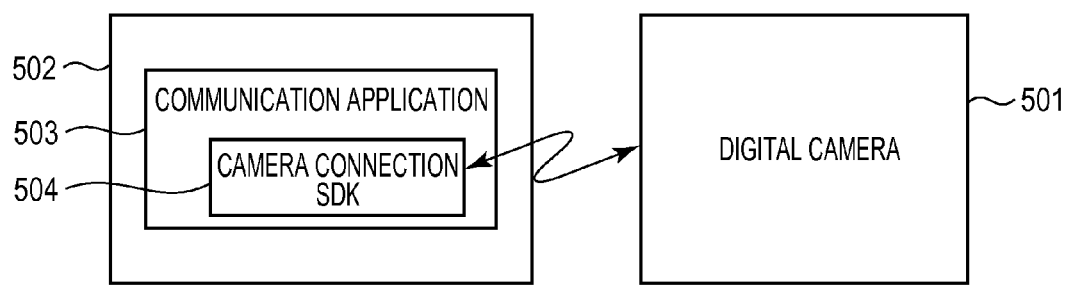
FIG. 4 is an explanatory view illustrating connection between an application structure activated in an external device and a digital camera.
FIG. 5 illustrates a table included in the digital camera.

FIG. 4 illustrates an example of a software structure of the present embodiment. To control a digital camera 501 using an external device 502 of the present embodiment, a communication application 503 for controlling a camera has to be installed. The communication application 503 is application software mainly used to control the digital camera 501. A user may download the communication application 503 from, for example, a predetermined server on the Internet, and install the downloaded communication application 503 on the external device 502. The communication application 503 includes, as a library, a camera connection software development kit (referred to as an SDK hereinafter) 504 which functions as a communication module with the digital camera 501. Accordingly, the external device 502 having the communication application 503 installed therein comes to communicate with the digital camera 501 directly via the SDK 504. Specifically, the SDK 504 is a software program included in the communication application 503 and mainly used for communications with the digital camera 501. Other functions of the communication application 503, such as receiving user operations, displaying the GUI, or activating and terminating the communication application 503, shall be borne by software programs other than the SDK 504.

In the present embodiment, an SDK for normal PC (referred to as an SDK for PC hereinafter) and an SDK for portable terminal such as a portable phone (referred to as an SDK for portable terminal hereinafter) are provided. It is assumed herein that the normal PC refers to a desktop PC or a notebook PC, while the portable terminal refers to a portable phone or a tablet device, as represented by a so-called smartphone.

Both types of SDKs are assumed to be provided to an application developer from a vendor of the digital camera 501. Therefore, the application developer determines which type of SDK should be incorporated into the communication application 503 depending on whether the external device 502 to which the application is planned to be installed is the PC or the portable terminal. If it is desired to control the digital camera 501 by the PC or the portable terminal, the vendor prepares two types of applications including an application to which the SDK for PC is incorporated and an application to which the SDK for portable terminal is incorporated.

In general, the portable terminals such as portable phones have a difference in spec in terms of processing ability or the size of the screen, compared to a PC. In the present embodiment, therefore, different types of executable processing are provided for the PC application and the portable terminal application. Thus, the processing executable according to devices is controlled by using the SDK.

First, the structure of the digital camera 201 will be described. The digital camera 201 has two types of control mode including a PC application mode and a portable terminal application mode. The PC application mode is controlled by a PC application in which the SDK for PC has been incorporated. The portable terminal application mode is controlled by a portable terminal application in which the SDK for portable terminal has been incorporated.

In the above two types of mode, the processing executable by the external device is managed according to a management table held in the non-volatile memory 130 of the camera. FIG. 5 illustrates an example of the management table of the present embodiment. As illustrated in FIG. 5, different types of executable processing are provided for the PC application mode and the portable terminal application mode.

<Connection Sequence Between Digital Camera and PC>

Figure 6:
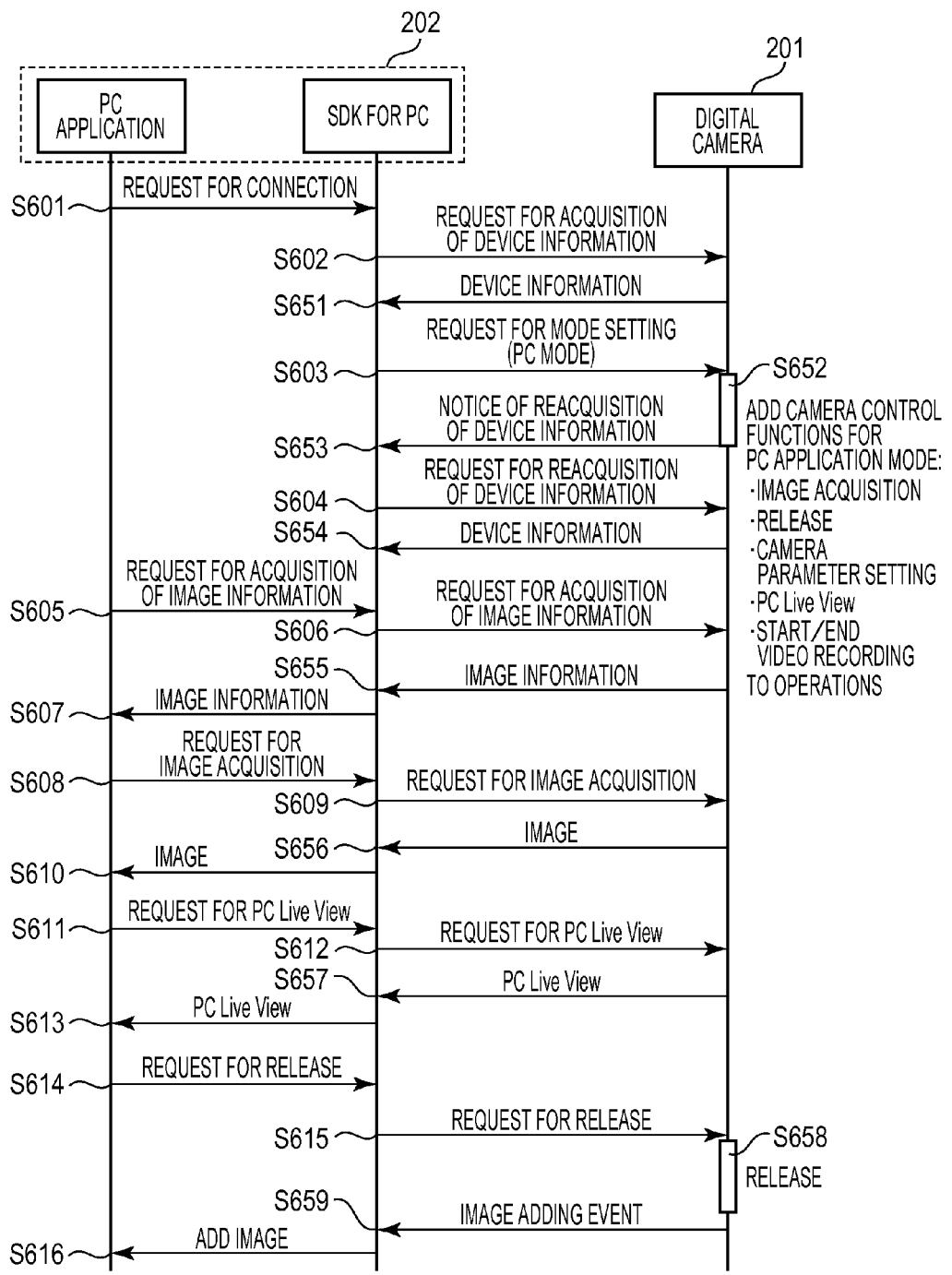
FIG. 6 illustrates a communication sequence between a PC and a digital camera.

FIG. 6 illustrates a processing sequence when the digital camera 201 and the PC 202 are coupled together according to the present embodiment. The sequence starts upon establishing connection between the PC 202, in which the PC application has been started, and the digital camera 201. The processing of the digital camera 201 in the sequence is implemented by the control unit such as the microcomputer 123 by controlling respective parts of the digital camera 201. The processing of the PC 202 in the sequence is implemented by the CPU 301 by controlling the respective components of the PC 202 according to input signals and programs.

In the description of the sequence, processing to be executed by reading a program independent of the SDK (referred to as a PC application hereinafter) and processing to be executed by reading the SDK for PC are provided separately in the PC application. In the description of the sequence, these types of software are mentioned as being the main part of the processing to facilitate understanding. Actually, however, the main part of the operation is the CPU 301 in which the PC application or the SDK for PC has been read.

First, the PC application sends a request for connection to the SDK for PC (S601).

The SDK for PC receives the request for connection, and sends a request for acquisition of device information to the digital camera 201 (S602).

The digital camera 201 receives the request for acquisition from the PC 202, and sends the device information to the PC 202 (S651). The device information includes operations handled by the digital camera 201, effective events, and a current property.

The device information is described in detail. The operation refers to a control command to the digital camera 201 and is mainly divided into two types of operations including an operation of sending an image held by the digital camera 201 and an operation of controlling photographing functions of the digital camera 201. The operation of sending an image held by the digital camera 201 is, for example, an "image acquisition" operation to send image data to the external device from the digital camera 201. A typical example of the operation for controlling photographing functions of the digital camera 201 is a "release" operation to cause the digital camera 201 to perform a still image taking operation. Other operations include, for example, a "PC live view" operation to send a so-called live view image to the external device from the digital camera 201, and a "start/end video recording" operation to cause the digital camera 201 to perform a video taking operation. Switching between the PC application mode and the portable terminal application mode is also regarded as the operation. In S651, the operation of switching between the PC application mode and the portable terminal application mode is informed as an available operation.

An event refers to a piece of information for notifying the external device of information generated in the digital camera 201. Examples of the event include an event where a setting value of the digital camera 201 is changed on the side of the digital camera 201, an event where photographing is performed by an operation on the side of the digital camera 201.

A property refers to a parameter of the digital camera 201 and includes, for example, a diaphragm value, a shutter speed value, and an International Organization for Standardization (ISO) sensitivity.

Referring again to FIG. 6, the SDK for PC acquires the device information and, by referring the device information, determines whether the digital camera 201 responds to the switching operation between the PC application mode and the portable terminal application mode. If it is determined that the digital camera 201 responds to the switching operation, the digital camera 201 is requested to set the PC application mode as the operation mode (S603).

Upon receiving the request for setting, the digital camera 201 refers to the controllable table of the PC application mode of FIG. 5, and adds controllable functions of "image acquisition", "release", "camera parameter setting", "PC live view", "start/end video recording" as available operations (S652).

To inform the addition of controllable functions, the digital camera 201 informs the PC 202 to request reacquisition of the device information (S653).

Upon receiving the notice, the SDK for PC sends a request for reacquisition of the device information to the digital camera 201 (S604).

Upon receiving the request for reacquisition of the device information, the digital camera 201 resends the current device information. Information regarding the functions added in S652 is also included in the device information to be sent. By receiving the device information in S654, the SDK for PC can recognize the functions available for controlling the digital camera 201.

Next, a control sequence of the digital camera 201 according to the PC application will be described.

Figure 8A:
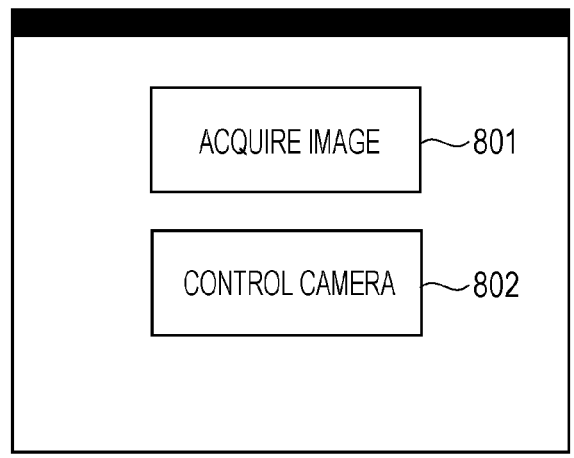
FIGS. 8A to 8C illustrate examples of display screens of a PC application and a portable terminal application.

FIG. 8A illustrates a GUI screen displayed by the PC application when the PC application is started. This screen may be displayed upon start-up of the PC application, or may be displayed after the notice of completion of the processing up to S654 by the SDK for PC is received.

The GUI screen of FIG. 8A includes an image acquiring button 801 and a camera controlling button 802. When a user presses the image acquiring button 801, the processing of sending an image from the digital camera 201 to the PC 202 starts. The camera controlling button 802 is used to change the digital camera 201 to a remote control mode.

Figure 8B:
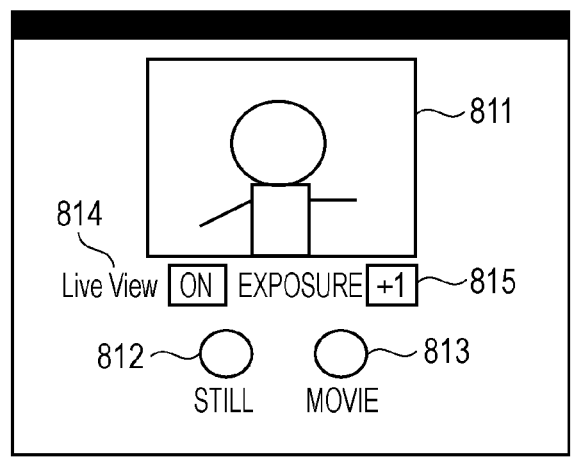

When the user presses the camera controlling button 802, the camera control screen illustrated in FIG. 8B is displayed to allow the PC 202 to control the digital camera 201. In the example of FIG. 8B, displaying a live view image, taking a still image, taking a video, and correcting exposure of the digital camera 201 are listed as functions controllable by the PC 202. A live view button 814 determines to set, or not set, displaying of the live view image acquired from the digital camera 201. In an ON state, the PC 202 acquires the live view image from the digital camera 201 and displays the acquired live view image in a live view area 811. In an OFF state, the PC 202 does not acquire the live view image from the digital camera 201, and the live view area 811 comes into an undisplayed condition. A still image taking button 812 is configured to instruct the digital camera 201 to take a still image. A video image taking button 813 is configured to instruct the digital camera 201 to take a video image. If the video taking button 813 is pressed while the video is taken, the PC 202 instructs the digital camera 201 to stop taking the video. The exposure correcting button is configured to instruct the digital camera 201 to take a still image. When the exposure correcting button is pressed by the user operation, candidate correction values (e.g., −2 to +2) are displayed so as to set a desired correction value.

Next, it will be described about the case where the image acquiring button 801 on the GUI screen is pressed by the user operation. The PC application detects a user operation and requests the SDK for PC to acquire the image information (S605). In the present embodiment, the image information refers to an ID such as a file name which identifies an image, the size and format of a file, etc. A thumbnail corresponding to the image may be sent as the image information. The SDK for PC sends a request for acquisition of the image information to the digital camera 201 (S606).

In S655, the SDK for PC receives the image information from the digital camera 201, and passes the received image information to the PC application in S607. According to the image information acquired in S607, the PC application displays a list of file names and thumbnails to allow the user to select an image to be acquired. The PC application then sends to the SDK for PC a request for image acquisition (S608). The request includes an ID of the image selected as the image to be acquired.

Upon receipt of the request for image acquisition, the SDK for PC determines whether the request for image acquisition from the PC application is effective according to the presence or absence of the "image acquisition" in the operation received in S654. If it is determined that the request for image acquisition is effective, the SDK for PC sends the request for image acquisition to the digital camera 201 together with the ID of the image to be acquired in S609.

Upon receipt of the request for image acquisition in S609, the digital camera 201 reads the image having the ID of the image to be acquired from the memory 120 and sends the image to the SDK for PC (S656).

In S610, the SDK for PC passes the received image to the PC application. By this processing, the PC application can display the image received from the digital camera 201.

Next, it will be described about the case where a camera controlling button 802 on a UI screen of the PC application is pressed by the user operation. In this case, the PC application displays a camera controlling UI screen as illustrated in FIG. 8B in S611, and sends a request for PC live view to the SDK for PC.

Upon receipt of the request for PC live view, the SDK for PC determines whether the operation acquired in S654 includes the PC live view. If it is present, the request for PC live view is sent to the digital camera 201 in S612.

Upon receipt of the request for PC live view, the digital camera 201 creates a PC live view image and sends it to the SDK for PC in S657.

In S613, the SDK for PC passes the received PC live view image to the PC application. By this processing, the PC application can display the live view image received from the digital camera 201.

Next, it will be described about the case where the still image taking button 812 of the PC application is pressed by the user operation.

When the still image taking button 812 is pressed by the user operation, the PC application sends a request for release to the SDK for PC in S614.

Upon receipt of the request for release, the SDK for PC determines whether the operation acquired in S654 includes the release. If it is present, the request for release is sent to the digital camera 201 in S615.

The digital camera 201 receives the request for release, and performs the release operation to newly photograph and acquire an image in S658. When the image is acquired, the digital camera 201 sends an image adding event to the SDK for PC in S659. The SDK for PC then sends the received image adding event to the PC application in S616. Thus, the PC application can recognize that the new image has been acquired on the side of the digital camera 201.

<Connection Sequence Between Digital Camera and Portable Terminal>

Figure 7:
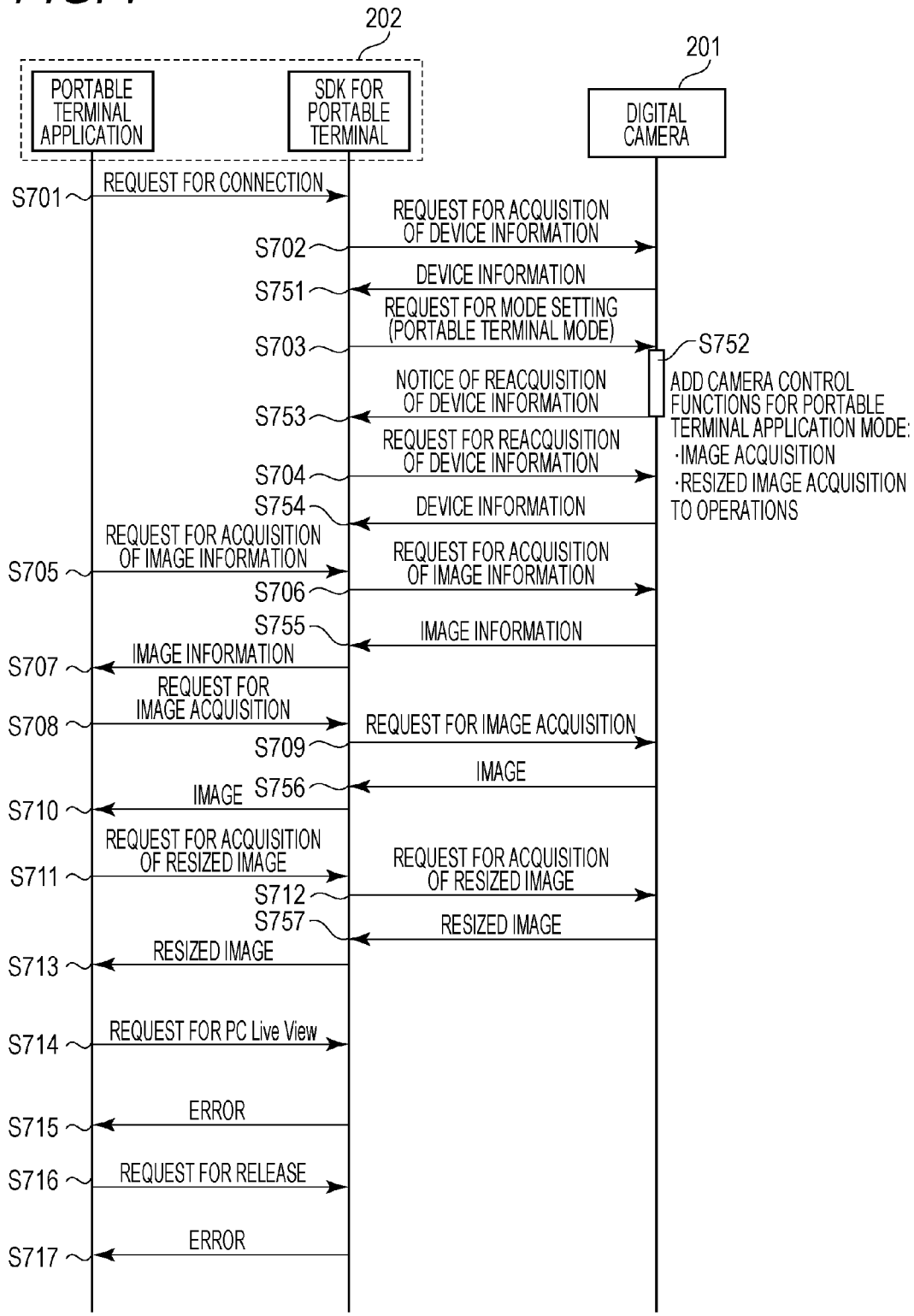
FIG. 7 illustrates a communication sequence between a portable terminal and a digital camera.

FIG. 7 illustrates a processing sequence when the digital camera 201 and the portable terminal 203 are coupled together according to the present embodiment. The sequence starts upon establishing connection between the PC 203, in which the portable terminal application has been started, and the digital camera 201. The processing of the digital camera in the sequence is implemented by the control unit such as the microcomputer 123 by controlling respective components of the digital camera 201. The processing of the portable terminal 203 in the sequence is implemented by the CPU 400 by controlling the respective parts of the portable terminal 203 according to input signals and programs.

In the description of the sequence, processing to be executed by reading a program independent of the SDK (referred to as a portable terminal application hereinafter) and processing to be executed by reading the SDK for portable terminal are provided separately in the portable terminal application. In the description of the sequence, these types of software are mentioned as being the main part of the processing to facilitate understanding. Actually, however, the main part of the operation is the CPU 400 in which the portable terminal application or the SDK for portable terminal has been read.

Since the sequence only differs from the sequence of FIG. 6 in that the PC 202 is replaced by the portable terminal 203 in most of the processing. Such processing, therefore, may not be described below accordingly.

First, the processing executed in S701, S702, and S751 is similar to that of S601, S602, and S651 of FIG. 6, and the description thereof will not be repeated.

The SDK for portable terminal acquires the device information in S751, and determines, by referring to the device information, whether the digital camera 201 responds to a switching operation between the PC application mode and the portable terminal application mode. If it is determined that the digital camera 201 responds to the switching operation, a request for setting the operation mode to the portable terminal application mode is sent to the digital camera 201 (S703).

Upon receiving the setting request, the digital camera 201 refers to the controllable table of the PC application mode of FIG. 5, and adds controllable functions of "image acquisition" and "resized image acquisition" as available operations (S752). The operations added here are different from those added to the PC application mode. Specifically, the digital camera 201 determines whether the opponent device is a portable terminal according to the mode information notified by the SDK. If the opponent device is a portable terminal, the available functions are restricted.

The processing executed in S753, S704, and S754 is similar to that of S653, S605, and S654 of FIG. 6, and the description thereof will not be repeated.

Figure 8C:
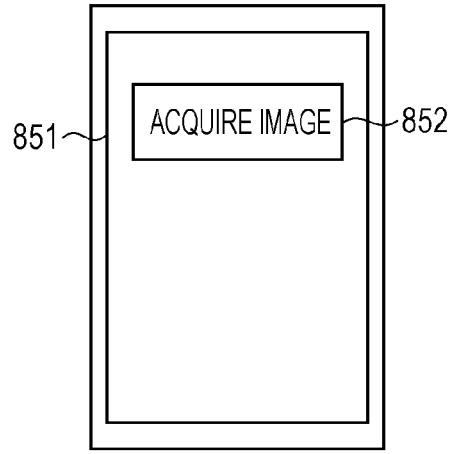

FIG. 8C illustrates an example of the portable terminal application screen. The portable terminal application of the present embodiment is different from the PC application, and includes a function to acquire images held by the digital camera 201 instead of the remote control function of photographing of the digital camera 201. Thus, a button 852 for instructing image acquisition is displayed on the screen 851.

Next, it will be described about the case where the image acquiring button 852 is pressed. In a typical portable terminal, data processing ability is lower than that of PC, and it may take time to receive or display large sized data. If, therefore, a large sized image is to be received, the portable terminal application of the present embodiment is configured to send a request to the digital camera 201 to resize the image as a smaller size image before sending.

Referring again to FIG. 7, the processing executed in S705, S706, S755, and S707, which are executed when the user operation of pressing the image acquiring button 852 is detected, is similar to that of S605, S606, S655, and S607 of FIG. 6, and the description thereof will not be repeated. Similar to the case of the PC application, the portable terminal application displays a list of file names and thumbnails to allow the user to select an image to be acquired according to the image information acquired in S707.

When the image to be acquired is selected, the portable terminal application determines whether the size of the selected image is not less than a predetermined value according to the image information acquired in S707. As used herein, the predetermined value is, for example, a specific byte number (e.g., 5 MB or more) which has been previously held in the portable terminal application. If, for example, the size of the image received in S755 includes the size information of S, M, L, etc., such size information may be used (e.g., size M or larger). If it is determined that the selected image is not more than the predetermined value, the portable terminal application passes the request for image acquisition to the SDK for portable terminal similarly to the PC application. If it is determined that the selected image is of the predetermined value or more, the portable terminal application passes the request for acquisition of a resized image to the SDK for portable terminal, and requests a smaller sized image.

First, it will be described about the case where it is determined that the size of the selected image is less than the predetermined size. In this case, the portable terminal application requests the SDK for portable terminal to acquire an image (S708). The request includes an ID of the image to be acquired.

Upon receipt of the request for image acquisition, the SDK for portable terminal determines whether the request for image acquisition from the portable terminal application is effective, according to the presence or absence of the "image acquisition" in the operation received in S754. If it is determined that the request for image acquisition is effective, the SDK for portable terminal sends the request for image acquisition to the digital camera 201 together with the ID of the image to be acquired in S709.

Upon receipt of the request for image acquisition in S709, the digital camera 201 reads the image having the ID of the object to be acquired from the memory 120, and sends the image to the SDK for portable terminal (S756).

In S710, the SDK for portable terminal passes the received image to the portable terminal application. By this processing, the portable terminal application can display the image received from the digital camera 201.

Next, it will be described about the case where it is determined that the size of the selected image is not less than the predetermined size. In this case, the portable terminal application sends a request for acquisition of the resized image to the SDK for portable terminal (S711). The request includes an ID of the image to be acquired.

Upon receipt of the request for acquisition of the resized image, the SDK for portable terminal determines whether the request for acquisition of the resized image is effective according to the presence or absence of the "resized image acquisition" in the operation received in S754. If it is determined that the request for acquisition of the resized image is effective, the SDK for portable terminal sends the request for acquisition of the resized image to the digital camera 201 together with the ID of the image to be acquired in S712.

Upon receipt of the request for acquisition of the resized image in S712, the digital camera 201 reads the image having the ID of the image to be acquired from the memory 120, and resizes the image to a predetermined size. The digital camera 201 may previously hold a target size for the resized image, or the target size may be notified to the digital camera 201 by the SDK for portable terminal. After the resized image has been created, the digital camera 201 sends the image to the SDK for portable terminal (S757). The operation of acquiring the resized image and the operation of image acquisition are combined in the present embodiment. Alternatively, the resizing operation is provided, and the SDK for portable terminal identifies the ID of the image to instruct the digital camera 201 to perform resizing. In this case, the digital camera 201 notifies the SDK for portable terminal upon completion of the resizing, and the SDK for portable terminal acquires the resized image in the image acquiring operation.

In S713, the SDK for portable terminal passes the received resized image to the portable terminal application. By this processing, the portable terminal application can display the image received from the digital camera 201.

If a plurality of images is selected as the object to be acquired, the portable terminal application determines for each image whether the request for image acquisition or the request for acquiring the resized image is performed, and sends a request according to a determination result.

The portable terminal application of the present embodiment does not include the GUI for performing the live view or releasing. Even when the SDK for portable terminal receives the request for live view for PC or the request for release from the portable terminal application including the GUI for performing the live view or releasing, the SDK for portable terminal returns an error (S714 to S717). Thus, it is possible to send a notice of error appropriately without requiring communications with the digital camera 201.

When the application is complete, the SDK performs disconnecting processing from the digital camera 201 for both the PC application and the portable terminal application, and the control functions having been added in each mode are deleted.

In the structure as described above, the control terminal connected to the digital camera can be provided with optimal control functions, even when the control terminals have different hardware spec, such as between the PC and the portable terminal.

Types of the operations are not limited to those described in the present embodiment, nor is the structure of the table illustrated in FIG. 5. For example, as the portable terminal may be used in remote photographing of commemorative pictures at resort areas, the release or PC live view operation may also be allowed in the portable terminal application mode as the available operation. In this case, an operation of sending the live view image at a lower image quality or transfer rate compared to the PC live view may be provided separately, and used in the portable terminal application mode. Since it is not often the case when detailed parameter settings are necessary in the portable terminal, the release operation may be made available, but the camera parameter settings may not be made available. Alternatively, it is also possible to divide the camera parameters into a plurality of operations according to parameters, and some operations alone may be used in the portable terminal.

Second Embodiment

In the first embodiment, it has been described about the example where different operations are made available depending on whether the opponent is the PC or the portable terminal. In contrast, in the present embodiment, the available operations are switched depending on whether such operations are created by the vendor of the digital camera. It might be desirable in terms of further expansion of the camera system to disclose the SDK for controlling the digital camera to third parties other than the vendor of the digital camera to create an application. Meanwhile, however, making all operations available may lead to unexpected controls by the vendor, such that it is desirable to provide certain restrictions on the available operations.

In the present embodiment, therefore, different operations are provided depending on whether the operations are from the vendor of the digital camera.

The present embodiment will be described in detail below. Since the present embodiment and the first embodiment are common in many portions, such common portions will not be described and specific portions unique to the present embodiment will mainly be described.

The digital camera 201 according to the present embodiment has a communication mode (vendor application mode) to communicate with a PC application created by the vendor of the digital camera 201 (referred to as a vendor application hereinafter), and a communication mode (normal application mode) to communicate with a PC application created by a third party other than the vendor (referred to as a normal application hereinafter). Operations available in each mode are different and a table representing a relation between the modes are held in the non-volatile memory 130. FIG. 9 illustrates an example of the table. In the example of FIG. 9, the "image acquisition", "release", "camera parameter setting", "PC live view", and "start/end video recording" operations are available in the vendor application mode. In the normal application mode, the "image acquisition" operation is available. The SDK for PC also has the vendor application mode and the normal application mode, and usually operates in the normal mode unless any specific instruction is given from the PC application.

Figure 10:
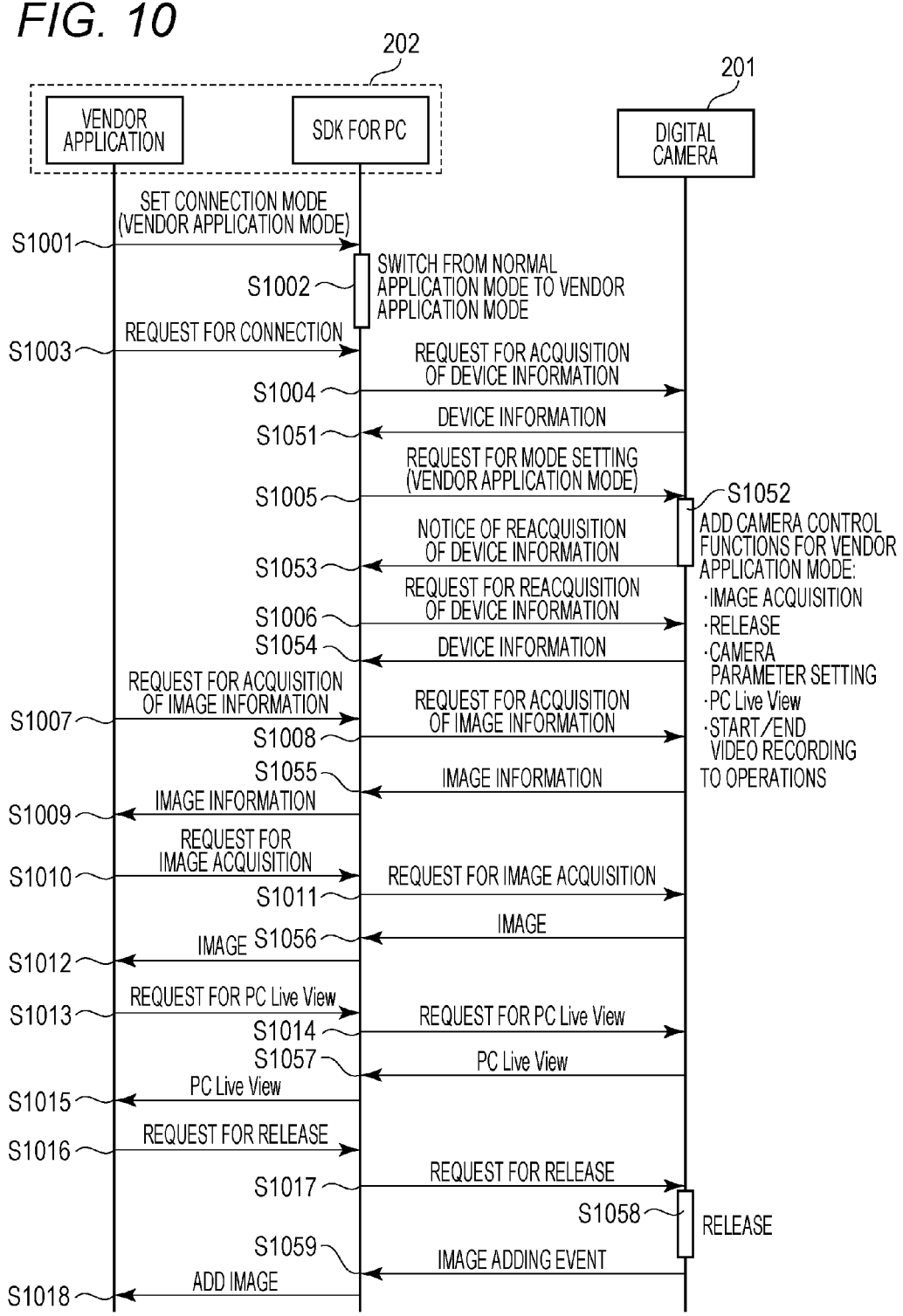
FIG. 10 illustrates a communication sequence between a PC and a digital camera.

FIG. 10 illustrates a processing sequence in the application mode of a company according to the second embodiment of the present invention.

Figure 11:
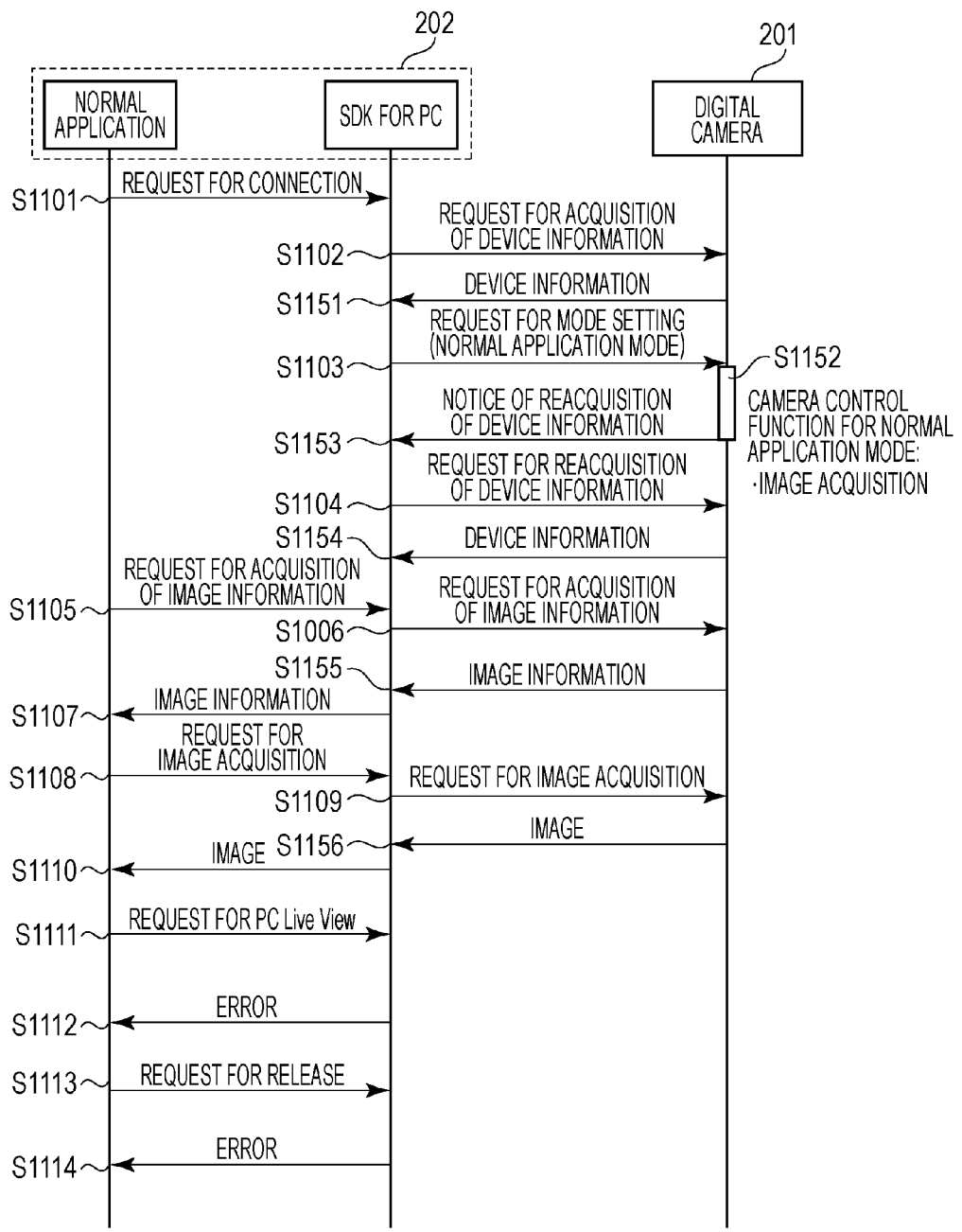
FIG. 11 illustrates a communication sequence between a PC and a digital camera.

FIG. 11 illustrates a processing sequence in the application mode of another company according to the second embodiment of the present invention.

By referring to the table of FIG. 9 and the sequence diagrams of FIGS. 11 and 12, it will be described about the change of functions provided by the digital camera according to different mode of connections between the digital camera and the SDK for PC of the second embodiment.

<Connection Sequence Between Digital Camera and Vendor Application>

FIG. 10 illustrates a processing sequence when the digital camera 201 and the PC 202 are connected according to the present embodiment. It will be described in the flow about the case where a vendor application has started on the PC 202.

In S1001, the vendor application sends to the SDK for PC a request for setting the vendor application mode as the connection mode.

In S1002, the SDK for PC switches the connection mode of the SDK for PC from the normal application mode to the vendor application mode.

In S1003, the vendor application passes the request for connection to the SDK for PC.

Processing of S1004 and S1051 are similar to the processing of S602 and S651 of FIG. 6.

In S1051, the SDK for PC acquires the device information, and determines, by referring to the acquired device information, whether the digital camera 201 responds to the switching operation between the vendor application mode and the normal application mode. If it is determined that the digital camera 201 responds to the switching operation, a request for setting the operation mode to the vendor application mode is sent to the digital camera 201 to match its own operation mode (S1005).

Upon receipt of the setting request, the digital camera 201 refers to the table of the vendor application mode of FIG. 9, and adds controllable functions of "image acquisition", "release", "the camera parameter setting", "PC live view", and "start/end video recording" as available operations (S1052).

Subsequent processing from S1006 to S1018 and from S1053 to S1059 are similar to the processing from S604 to S616 and from S653 to S659 of FIG. 6, and the description thereof will not be repeated.

<Connection Sequence Between Digital Camera and Normal Application>

Next, FIG. 11 illustrates a processing sequence when the digital camera 201 and the PC 202 are connected according to the present embodiment. It will be described in the flow about the case where the normal application has started on the PC 202.

When the normal application starts on the PC 202, a request for connection is passed to the SDK for PC, which is largely different from the case of the vendor application in that the mode setting of the SDK for PC is not requested as in S1001 of FIG. 10. As mentioned above, the SDK for PC operates in the normal application mode unless any specific request is given from the PC application.

The processing of S1102 and S1151 are similar to the processing of S602 and S651 of FIG. 6.

In S1151, the SDK for PC acquires the device information, and determines, by referring to the acquired device information, whether the digital camera 201 responds to the switching operation between the vendor application mode and the normal application mode. If it is determined that the digital camera 201 responds to the switching operation, a request for setting the operation mode to the normal application mode is sent to the digital camera 201 to match its own operation mode (S1103).

Upon receipt of the setting request, the digital camera 201 refers to the table of the vendor application mode of FIG. 9, and adds a controllable function of "image acquisition" as an available operation (S1152).

Subsequent steps from S1104 to S1110 and from S1153 to S1156 are similar to the processing from S604 to S610 and from S653 to S656 of FIG. 6, and the description thereof will not be repeated.

Next, it will be described about the case where the SDK for PC receives a request for PC live view (S1111). In this case, the SDK for PC determines whether the operation acquired in S1154 includes the PC live view operation. When the SDK for PC is in the normal application mode, the PC live view operation cannot be acquired in S1154, and the SDK for PC returns an error to the normal application (S1112). Similarly, if the request for release is sent to the SDK for PC (S1113), the SDK for PC returns an error (S1114).

As described above, the SDK of the present embodiment controls the digital camera mode depending on whether the SDK is incorporated in the normal application or the vendor application, and provides different available operations. Thus, the operations available in respective applications can be properly restricted.

In the present embodiment, it has been described about the case where both the vendor application and the normal application are prepared for the PC application. Alternatively, the vendor application and the normal application may also be prepared for the portable terminal application, and different operations may be made available for each application.

Third Embodiment

In the first embodiment, a larger number of available operations have been provided in the table for the PC application compared to the portable terminal application, as the PC has higher spec than the portable terminal, but the structure is not limited thereto.

For example, the PC may not be taken out from home frequently, but the portable terminal may be taken out and carried in daily life. Accordingly, it is considered to be desirable to set the portable terminal to allow a remote photographing function, such as self-photographing of the user, by operating the portable terminal.

Therefore, the table may be configured as illustrated in FIG. 12 to prohibit or restrict operations from the PC, and the camera can be controlled only from the portable terminal.

In this structure, the camera control functions matching the use of the PC and the portable terminal can be provided.

OTHER EMBODIMENTS

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-244243, filed Nov. 26, 2013, which is hereby incorporated by reference herein in its entirety.

What is claimed is:

1. A communication apparatus, comprising:
a processor;
an interface configured to communicate with an external device, the external device using a communication application including a first program for receiving a user operation to communicate with the communication apparatus, and a second program for communicating with the communication apparatus using at least one control operation;
wherein the processor is configured to perform functions of at least one following unit,
a notification unit configured to notify the external device, via the interface, of at least one control operation available for the external device among control operations for controlling the communication apparatus in communication between the communication apparatus and the external device; and
a determination unit configured to determine a type of the second program used by the external device,
wherein the notification unit provides, via the interface, a different control operation to be notified according to the type of the second program.

2. The communication apparatus according to claim 1, further comprising:
a photographing unit configured to photograph an object.

3. The communication apparatus according to claim 2, wherein the control operations include an operation of acquiring image data held in the communication apparatus.

4. The communication apparatus according to claim 3, wherein the control operations include at least one control operation regarding remote photographing.

5. The communication apparatus according to claim 4, wherein the control operation regarding remote photographing includes at least one of photographing a still image, photographing a video, acquiring a live view image, and controlling photographing parameters.

6. The communication apparatus according to claim 4, wherein when it is determined by the determination unit that the second program is a program for a portable terminal, the notification unit does not notify the external device of the at least one control operation regarding the remote photographing as an available control operation.

7. The communication apparatus according to claim 6, wherein when it is determined by the determination unit that the second program is the portable terminal program, the notification unit notifies that the control operation of acquiring resized image data is the available control operation.

8. A control method for a communication apparatus, comprising:

communicating with an external device using a communication application including a first program for receiving a user operation to communicate with the communication apparatus, and a second program for communicating with the communication apparatus using at least one control operation;

notifying the external device, via an interface, of at least one control operation available for the external device among control operations for controlling the communication apparatus in the communication between the communication apparatus and the external device; and determining a type of the second program used by the external device, wherein in the notifying, a different control operation to be notified is provided, via the interface, according to the type of the second program.

9. A non-transitory computer readable recording medium storing computer executable instructions that, when executed by a computer, cause the computer to perform the method of claim 8.

10. The communication apparatus according to claim 1, wherein the notification unit is capable of making a notification of plural control operations, and wherein, regardless of whether the second program is determined by the determination unit as a program of a first type or a program of a second type, the control operations notified by the notification unit include a control operation for acquiring image data.

11. The communication apparatus according to claim 1, wherein the determination unit determines whether the second program is an application of a vender of the communication apparatus or not.

12. The communication apparatus according to claim 11, wherein, in a case where it is determined by the determination unit that the second program is the application of the vender of the communication apparatus, the notification unit notifies the external device of a larger number of control operations than in a case where the second program is not the application of the vender of the communication apparatus.

13. The communication apparatus according to claim 11, wherein, in a case where it is determined by the determination unit that the second program is the application of the vender of the communication apparatus, the notification unit notifies the external device of the at least one control operation regarding remote photographing, and wherein, in a case where it is determined by the determination unit that the second program is not the application of the vender of the communication apparatus, the notification unit does not notify the external device of the at least one control operation regarding remote photographing.

14. The communication apparatus according to claim 11, wherein, in a case where it is determined by the determination unit that the second program is the application of the vender of the communication apparatus, the notification unit notifies the external device of the at least one control operation regarding video recording, and wherein, in a case where it is determined by the determination unit that the second program is not the application of the vender of the communication apparatus, the notification unit does not notify the external device of the at least one control operation regarding video recording.

15. The communication apparatus according to claim 11, wherein, in a case where it is determined by the determination unit that the second program is the application of the vender of the communication apparatus, the notification unit notifies the external device of the at least one control operation regarding parameter setting of the communication apparatus, and wherein, in a case where it is determined by the determination unit that the second program is not the application of the vender of the communication apparatus, the notification unit does not notify the external device of the at least one control operation regarding parameter setting of the communication apparatus.

16. The communication apparatus according to claim 1, further comprising:

a receiving unit configured to receive predetermined information from the external device via the interface, wherein the determination unit determines the type of the second program on the basis of the predetermined information received by the receiving unit.

17. The communication apparatus according to claim 1, wherein the notification unit notifies the external device of a mode switching operation depending on the type of the second program via the interface before the determination by the determination unit.

18. The communication apparatus according to claim 1, wherein the determination unit determines whether the second program is a program for a portable terminal or a program for a personal computer.

19. The communication apparatus according to claim 1, wherein the determination unit determines whether the second program is a program for a portable terminal or not, and the portable terminal includes a portable phone or a tablet device.

* * * * *